United States Patent [19]
Klebe et al.

[11] 3,789,052
[45] Jan. 29, 1974

[54] IMIDO-ALKYLENE SUBSTITUTED AROMATIC CARBOCYCLIC POLYMERS

[75] Inventors: Johann F. Klebe; Thomas J. Windish, both of Schenectady, N.Y.

[73] Assignee: General Electric Company, Schenectady, N.Y.

[22] Filed: Apr. 30, 1971

[21] Appl. No.: 139,208

Related U.S. Application Data

[62] Division of Ser. No. 846,623, July 1, 1969, abandoned.

[52] U.S. Cl...... 260/47 CZ, 117/132 R, 117/161 P, 117/161 UN, 204/159.14, 204/159.22, 260/30.2, 260/31.8 R, 260/32.6 N, 260/33.6 UA, 260/33.8 UA, 260/41 R, 260/47 UA, 260/47 XA, 260/47 ET, 260/78 UA
[51] Int. Cl............................................. C08g 20/00
[58] Field of Search... 260/78 UA, 47 UA, 47 CZ, 260/47 X, 47 C, 47 ET

[56] References Cited
UNITED STATES PATENTS

| | | | |
|---|---|---|---|
| 3,352,832 | 11/1967 | Barr et al. | 260/78 UA |
| 3,373,226 | 3/1968 | Gowan | 260/47 ET |
| 3,380,964 | 4/1968 | Grundschober et al. | 260/78 UA |
| 3,652,710 | 3/1972 | Holub et al. | 260/78 UA |

*Primary Examiner*—Harold D. Anderson
*Attorney, Agent, or Firm*—William A. Teoli et al.

[57] ABSTRACT

A variety of imido-alkylene substituted aromatic carbocyclic organic polymers are provided, such as polymers having chemically combined aromatic carbocylic radicals in the polymer backbone, for example, polyarylene oxides, and polymers having pendant aromatic carbocyclic radicals, such as polystyrenes. Blends of such polymers with various aliphatically unsaturated organic monomers and a variety of organic polymers also are included. The imido-substituted aromatic carbocyclic polymers of the present invention can be employed as molding compounds, photoresists, laminates, varnishes, adhesives, decorative coatings, etc.

8 Claims, No Drawings

IMIDO-ALKYLENE SUBSTITUTED AROMATIC CARBOCYCLIC POLYMERS

This application is a division of our abandoned application Ser. No. 846,623, filed July 1, 1969, entitled IMIDO-ALKYLENE SUBSTITUTED AROMATIC CARBOCYCLIC POLYMERS AND BLENDS THEREOF.

The present invention relates to various imidoalkylene substituted aromatic carbocyclic organic polymers and blends of such polymers with a variety of organic monomers and organic polymers.

Some of the imido-alkylene substituted aromatic carbocyclic polymers of the present invention have at least one chemically combined imido-methylene radical of the formula,

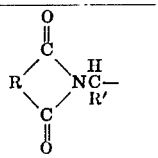

referred to hereinafter as an M radical, joined to an aromatic carbocyclic radical of an organic polymer, which can be in the polymer backbone, or in a pendant position along the polymer backbone, where R is a divalent organo radical selected from hydrocarbon radicals and halogenated hydrocarbon radicals, and R' is a monovalent radical selected from hydrogen monovalent hydrocarbon radicals and halogenated monovalent hydrocarbon radicals.

Radicals included by R, are, for example, arylene radicals, such as phenylene, bisphenylene, naphthylene, anthrylene, etc., alkylene radicals, such as ethylene, trimethylene, tetramethylene, etc., halogenated arylene and alkylene radicals such as chlorophenylene, chloronaphthylene, chloroethylene, chlorotrimethylene, etc.; aliphatically unsaturated radicals, such as

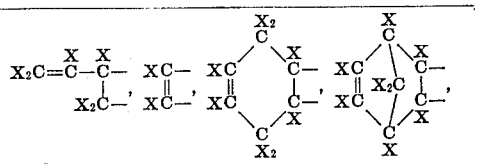

where X is a radical selected from hydrogen, lower alkyl, halogen, or mixtures thereof, such as chloro, methyl, ethyl, propyl, bromo, etc. Monovalent and hydrocarbon radicals included by R' are, for example, phenyl, chlorophenyl, methyl, ethyl, propyl, butyl, pentyl, hexyl, heptyl, octyl, etc.

The imido-substituted "Backbone" polymers of the present invention having at least one chemically combined M radical attached to an aromatic carbocyclic radical are shown by the formula, 2. $+(R'')(Z)_a+_n$, where R'' is a polyvalent aromatic organo radical selected from M-substituted aromatic carbocyclic organo radicals selected from hydrocarbon radicals and halogenated hydrocarbon radicals, and a mixture of such M-substituted aromatic carbocyclic radicals, and other polyvalent organo radicals free of M-substitution selected from hydrocarbon radicals and halogenated hydrocarbon radicals, Z is a polyvalent connective, $a$ is a whole number having a value of 0 or 1 and $n$ is an integer equal to 2 to 1,000 inclusive, and preferably 5 to 500 inclusive.

Radicals included by R'' of formula (2) are selected from a. M-substituted aromatic carbocyclic radicals having from six to 18 carbon atoms selected from hydrocarbon radicals and halogenated hydrocarbon radicals, b. a mixture of (a) radicals and the same aromatic carbocyclic radicals free of M-substitution, and (a), or (a) and (b) radicals, c. a mixture of (a), or (a) and (b) radicals, and polyvalent aliphatic radicals selected from hydrocarbon radicals and halogenated hydrocarbon radicals, where the (a) or (a) and (b) radicals are present in the mixture in an amount which is sufficient to provide for at least about 1 mole percent of (a) radicals based on the total moles of radicals in (c).

Polyvalent connectives included by Z of formula (2) are, for example,

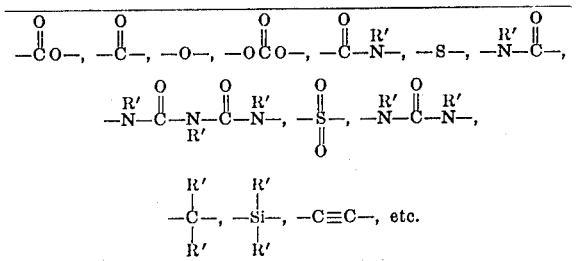

and mixtures thereof, where R' is as previously defined.

The imido-substituted aromatic carbocyclic organic polymers of the present invention also include M-substituted polymers of the formula,

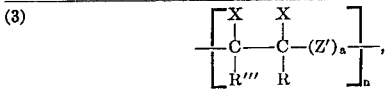

having chemically combined "pendant" aromatic carbocyclic radicals where R', $a$ and $n$ are as previously defined, R''' is an M-substituted aromatic carbocyclic radical selected from hydrocarbon radicals and halogenated hydrocarbon radicals and a mixture of such M-substituted aromatic carbocyclic radicals and other monovalent organo radicals free of M-substitution selected from hydrocarbon radicals and halogenated hydrocarbon radicals, X is selected from R' radicals and halogen radicals, and Z' is a divalent organo connective.

Radicals included by R''' of formula (3) are pendant monovalent organo radicals selected from, d. M-substituted aromatic carbocyclic radicals having from six to 18 carbon atoms selected from hydrocarbon radicals and halogenated hydrocarbon radicals, and e. a mixture of (d) radicals, and the same aromatic carbocyclic radicals free of M-substitution, Z' is a divalent organo connective such as,

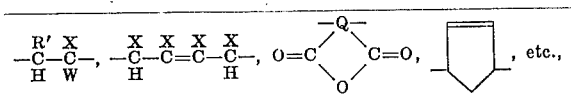

and mixtures thereof, where R' and X are as previously defined, Q is a polyvalent aliphatic radical derived from aliphatically saturated monovalent hydrocarbon radicals and halogenated hydrocarbon radicals, and W is a monovalent radical selected from hydrogen, alkyl radicals, halogen radicals, aliphatic ester radicals, aromatic ester radicals, amido radicals, nitrile radicals, and aliphatic nitrile radicals.

Among the carbocyclic radicals included by R'' of formula (2) there are phenylene, tolylene, xylylene, naphthylene, anthrylene, terphenylene, etc.; halogenated derivatives of such aromatic carbocyclic radicals; M-substituted derivatives of such aromatic carbocyclic radicals, such as,

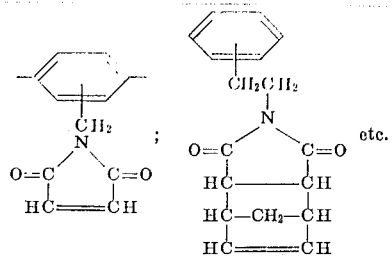

a mixture of such aromatic carbocyclic radicals, or derivatives thereof, where such mixtures contains at least about 1 mole percent and up to 99 mole percent, and preferably from 10 mole percent to 99 mole percent of such M-substituted aromatic carbocyclic radicals, with from 99 mole percent to 1 mole percent, and preferably from 90 mole percent to 1 mole percent of polyvalent organo radicals which can include aromatic carbocyclic radicals previously defined, and aliphatic organo radicals such as alkylene radicals, for example methylene, ethylene, trimethylene, etc., halogenated derivatives thereof, etc.

Among the carbocyclic radicals included by R''' of formula (3), there are, for example, phenyl, tolyl, xylyl, naphthyl, anthryl, etc.; halogenated derivatives of such monovalent aromatic carbocyclic radicals such as chlorophenyl, bromonaphthyl, etc.; M-substituted derivatives such as,

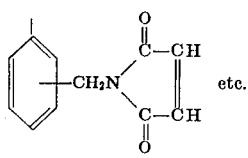

Imido-methylene radicals included by formula (1) are, for example,

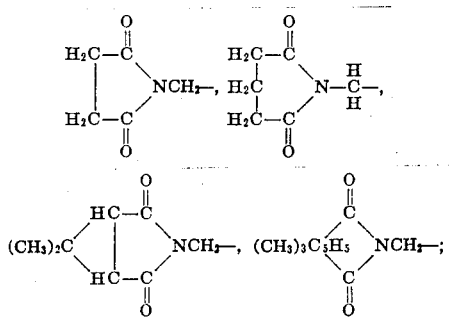

aromatic imido-methylene compounds, for example,

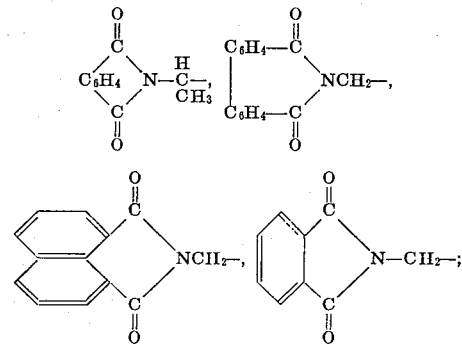

aliphatically unsaturated imido-methylenehalides of the formula,

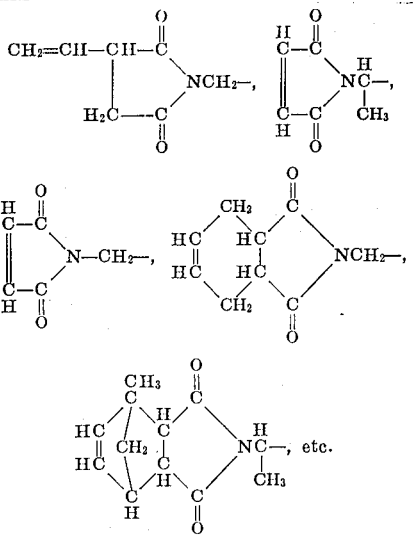

As taught in our copending application Ser. No. 838,322, now abandoned, filed concurrently herewith and assigned to the same assignee as the present invention, the imidomethylene substituted aromatic carbocyclic organic polymers of the present invention, for example, included by formulas (2) and (3), can be made by effecting contact between an aromatic carbocyclic organic polymer, and an imido-methylene compound of the formula, (4)

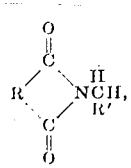

in the presence of a Friedel-Crafts' catalyst, where R, and R' are as previously defined and Y is a radical selected from hydroxy and halogen, such as chloro, bromo, fluoro, etc.

In addition to utilizing imido-methylene compounds of formula (4), there also is taught in our above-identified application Ser. No. 838,322, now abandoned, the employment of an imido-alkylene compound of the formula, (5) 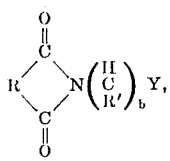

where b is an integer having a value of from 2 to 4, inclusive, and R, R' and Y are as previously defined. The imido-alkylene compounds of formula (5) can be employed with aromatic carbocyclic organic polymers included by formula (3) in the presence of a Friedel-Crafts' catalyst, such as boron trifluoride to produce pendant aromatic carbocyclic polymers having at least one chemically-combined imido radical of the formula, (6) 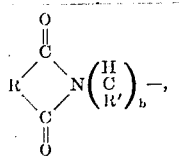

referred to hereinafter as an M' radical, where all of the terms are shown in formula (5). The pendant aromatic carbocyclic organic polymers are included by formula (3), except where R''' can be a mixture of aromatic carbocyclic radicals and imido-substituted aromatic carbocyclic radicals are substituted with M' radicals in place of M radicals.

Imido radicals included by formula (6) are, for example,

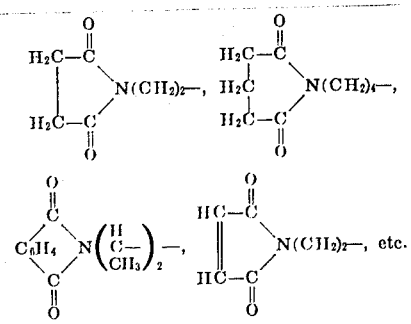

Also taught in our above-mentioned copending application is a method for introducing imido-alkylene substitution in a variety of backbone polymers, structurally similar to polymers of formula (2) to provide for a variety of imido-substituted polyaryleneoxides, polyarylene esters, polyarylene carbonates and polyamides, as respectively shown by F. Holub and C. Emerick Ser. No. 838316, now U.S. Pat. No. 3,652,710, F. Holub and M. Evans Ser. No. 838,314 now U.S. Pat. No. 3,652,716, Ser. No. 838,306 now U.S. Pat. No. 3,652,715, Ser. No. 838,315, now abandoned, all of which are filed concurrently herewith and assigned to the same assignee as the present invention.

Among the imido-alkylene substituted aromatic carbocyclic polymers of the present invention, there are included imido-methylene substituted aromatic carbocyclic polyethers, polyesters, polycarbonates, polyamides, polyamideimides, polyimides, polysulfones, polyurethanes, polybiurets, polyxylylene, polyarylacetylenes, polysulfides, polyarylsulfides, etc. In addition, there also are included imido-alkylene substituted polystyrenes, poly(α-methyl-styrene), polymethyl(α-methylstyrene), poly(dimethylstyrene), poly(chlorostyrene), poly(dichlorostyrene), styrene copolymers with butadiene, acrylonitrile, methylmethacrylate, vinylidenechloride, maleic anhydride, vinylchloride, vinylacetate, vinylamides, α-methylstyrene, etc.

In addition to the above-described imido-methylene substituted aromatic carbocyclic polymers, there also is included in the present invention imido-methylene substituted aromatic carbocyclic polymers in the form of random copolymers, block polymers, and graft copolymers containing at least 10 mole percent of R'' radicals or R''' radicals as defined in formulas (2) and (3). For example, there are included imido-methylene substituted polystyrene-polybutadiene graft copolymers, imido-methylene substituted polydimethylsiloxane-polyphenylenecarbonate block polymers, etc.

The imido-alkylene substituted aromatic organic polymer provided by the present invention can be employed in a variety of applications depending upon such factors as the type of aromatic organic polymer, the degree of imido-alkylene substitution in the polymer, and whether the imido-alkylene radicals, as shown by formulas (1) and (6), are aliphatically unsaturated, or free of aliphatic unsaturation. For example, in instances where the aromatic organic polymer has chemically combined imido-alkylene radicals of formulas (1) or (6) which are aliphatically unsaturated, these materials can be employed in a variety of applications such as molding compounds, varnishes, adhesives, laminating compounds, solvent-resistant coatings, dielectrics, insulating coatings, and several other applications normally requiring free radical and high energy electron curable materials convertible from the thermoplastic to the thermoset state, as more particularly shown for particular aromatic organic polymers described in the aforementioned copending applications. In instances where the aromatic organic polymers are substituted with imido-alkylene radicals of formulas (1) and (6) which are free of aliphatic unsaturation, such aromatic organic polymers can provide for solvent-resistant coating compounds, molding resins, high temperature and oxidatively stable fibers and films, etc.

The imido-alkylene substituted aromatic organic polymers of the present invention can be blended with various aliphatically unsaturated organic materials, such as aliphatically unsaturated organic monomers and certain aliphatically unsaturated organic polymers as well as organic polymers free of aliphatic unsaturation. Blends of the imido-alkylene substituted aromatic organic polymers and the aforementioned organic monomers or polymers can be made over a wide proportion by weight. Experience has shown that there should be employed at least about 5 percent, by weight, of the imido-alkylene substituted aromatic organic polymer to provide for cured products having improved characteristics. For example, if the imido-alkylene aromatic organic polymer has chemically combined aliphatically unsaturated imido-alkylene radicals of formula (1), the blend of the imido-alkylene substituted aromatic organic polymer with the aforementioned organic materials can be employed in making laminating compounds, solventless varnishes, molding compounds, coating compositions, etc., depending upon the proportions of the imido-aliphatically unsaturated imido-alkylene substituted aromatic organic polymer and the organic polymer or monomer utilized in the blend. Those skilled in the art would know, for example, that as the proportion of the imido-alkylene aromatic organic polymer having aliphatically unsaturated imido-alkylene radicals increased with respect to either the organic monomer or polymer in the blend, particularly where the mole percent substitution of the aliphatically unsaturated imido-alkylene radical on the aromatic organic polymer exceeded 25 mole percent or more, the degree of crosslinking of the blend would be sufficiently high to make the resulting cured product an ideal solvent-resistant coating or insulating material.

Included by the aliphatically unsaturated monomers that can be employed in combination with the imido-alkylene substituted aromatic organic polymers of the present invention are, for example, styrene, bismaleimide, N-phenylmaleimide, vinylchloride, isobutylene, butadiene, isoprene, chlorotrifluoroethylene, 2-methyl-pentene-1; vinyl esters of organic carboxylic acids such as vinylformate, vinylacetate, acrylonitrile, vinylmethyl, methyl, butyl,, etc., esters of acrylic and methacrylic acids, etc.; divinylbenzene, triallylcyanurate, triallyltrimellitate, and N-vinylphthalimide, N-allylphthalimide, N-allyltetrachlorophthalimide, vinylsiloxanes, etc. Among the organic polymers that can be employed in combination with the imido-alkylene substituted aromatic organic polymers of the present invention are, for example, polyvinylchloride, polyethylene, polypropylene, polysulfones, polystyrene, polyurethane, organopolysiloxanes, polyesters, polyphenylene oxides, epoxide resins, etc.

Cure of the imido-alkylene substituted aromatic organic polymer, or blend thereof with any of the aforementioned organic monomers or polymers, or combination thereof, can be effected with conventional free radical initiators at temperatures of from 50° to 300°C, while 100° to 200°C has sometimes been found to be more desirable. Acceleration of the cure of the imido-alkylene substituted aromatic organic polymer, or blend thereof, can be achieved with organic peroxides, such as dicumyl peroxide, benzoyl peroxide, tertiary butylperbenzoate, tertiary alkylperoxycarbonate, etc. The peroxides can be employed from about 0.1 percent to about 5 percent by weight, based on the total weight of the blend. In addition, high temperature radical sources can also be employed, such as the commercially available azodicarbonamides, 2,5-dimethyl,-2,5-bis(tertbutylperoxyhexane), etc. In addition, the imido-alkylene substituted aromatic organic polymers or blends thereof, in addition to being curable by the aforementioned free radical initiators, can be cured with heat or radiation with high energy electrons, x-rays, ultraviolet lighting, etc., depending upon the crosslinked density of the resulting imido-substituted aromatic organic polymer or blend thereof, desired.

In addition to the aforementioned aliphatically unsaturated monomers and organic polymers which can be blended with the imido-alkylene substituted aromatic organic polymers of the present invention, there can be employed, by weight, fillers in proportions of from 0 to 200 parts of filler, per 100 parts of the imido-alkylene substituted aromatic organic polymer. Included among the fillers which can be employed are, for example, clay, ground quartz, silica, sand, carbon black, glass fibers, glass beads, carbon fiber, asbestos, etc. In addition, other ingredients such as solvents at from 60 percent to 90 percent by weight of the resulting curable composition also can be employed such as N-methyl pyrrolidone, dimethylacetamide, toluene, methylenechloride, as well as plasticizers such as trioctylphthalate, etc.

In order that those skilled in the art will be better able to practice the invention, the following examples are given by way of illustration and not by way of limitation Stirring of the reactants occurred during the addition of the Friedel-Crafts' catalyst. All parts are by weight.

EXAMPLE 1

A mixture was made of 2.5 parts of a poly-(2,6-diphenyl-1,4-phenylene oxide) having an intrinsic viscosity of 0.82 in chloroform at 25°C, 0.375 part of N-chloromethymaleimide, 35 parts of anhydrous tetrachloroethane, and 15 parts of anhydrous nitrobenzene. Boron trifluoride was passed into the solution over a period of 15 hours while it was stirred at a temperature of 55°C. A quantitative yield of product was precipitated upon addition of methanol. Based on the method of preparation, the product was a maleimido-methyl-substituted polyphenylene oxide having an average of about 300 chemically combined phenylene oxide units, of which about 25 mole percent were substituted with maleimido-methyl radicals,

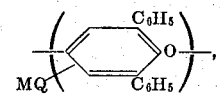

where M is a maleimido radical and Q is methylene, which were chemically combined with about 75 mole percent of phenylene oxide units of the formula,

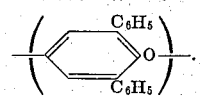

The identity of the product was confirmed by its elemental analysis.

A film of the imido-substituted polyphenylene oxide is cast from a tetrachlorethane solution onto an aluminum substrate. The film is exposed to β-radiation to a dosage of 50 MR. It is found to be insoluble in several organic solvents including tetrachloroethane and useful as an organic solvent resistant coating.

EXAMPLE 2

Mixtures of 5 parts of commercially-available polycarbonate prepared from 2,2-bis(4-hydroxyphenyl)-propane having an intrinsic viscosity in dioxane at 25°C of 0.50 and 0.72 parts of the N-chloromethylmaleimide were dissolved in 100 parts of an anhydrous mixture consisting of about 70 parts of tetrachloroethane and 30 parts of nitrobenzene. Boron trifluoride was introduced into the mixture at a rate of about one bubble per second over a period of about 50 hours, while the temperature was maintained at about 65°C. A quantitative yield of product was then recovered by precipitation with methanol. Based on the method of preparation and elemental analysis, the product was a polycarbonate having about 25 mole percent of

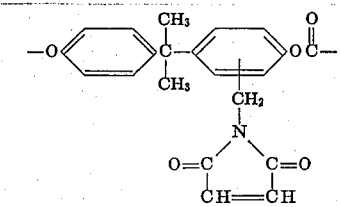

units, chemically combined with about 75 mole percent of,

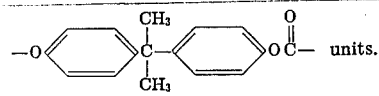 units.

| ELEMENTAL ANALYSIS, WT PERCENT | | | | | |
|---|---|---|---|---|---|
| Theory | | | Found | | |
| C | H | N | C | H | N |
| 73.4 | 5.2 | 1.25 | 72.6 | 5.3 | 1.2 |

A molded bar of the above imido-substituted polycarbonate is heated at 200°C for 30 minutes. It is found to be insoluble in several organic solvents including tetrachlorethane and benzene. The imido-substituted polycarbonate is useful in the manufacture of molded automotive parts, which after heat curing have the desired solvent and oil resistance.

EXAMPLE 3

Boron trifluoride was passed into a solution at 55°C consisting of 5 parts of a polystyrene having a molecular weight of 100,000, 1.83 parts of N-chloromethylmaleimide, 70 parts of anhydrous trichloroethane and 30 parts of anhydrous nitrobenzene. After 15 hours, a product was obtained by pouring the resulting mixture into methanol. Based on method of preparation and the infrared spectrum of the product which showed a strong carbonyl absorption at 1,720 $cm^{-1}$, the product was identified as a maleimido-methylene substituted polystyrene having about 25 mole percent of the phenyl radicals substituted with maleimido-methylene radicals based on the total moles of imido-substituted and unsubstituted phenyl radicals in the polystyrene. The identity of the polymer and the degree of substitution was further confirmed by elemental analysis. A thin film of the product containing about 1 percent of benzophenone was subjected to ultraviolet irradiation for 20 seconds. Those parts of the film that were exposed to the ultraviolet light were found to be insoluble in organic solvents. The product is useful as a photoresist.

EXAMPLE 4

Boron trifluoride is bubbled into a mixture of 5 parts of a polysulfone having a molecular weight of about 20,000 and consisting essentially of chemically combined phenylene radicals and sulfone radicals and 1 part of N-chloromaleimide and about 100 parts of solvent consisting of tetrachloroethane and nitrobenzene in a 7:3 ratio by weight. The boron trifluoride is bubbled into the mixture over a period of about 15 hours at room temperature at a rate of about 1 bubble per second. The mixture is poured into methanol to effect precipitation of the product. Based on method of preparation and a strong carbonyl peak at 1,720 $cm^{-1}$ in the infrared spectrum, the product is a maleimidomethyl-polysulfone having about 10 mole percent of its phenylene radicals substituted with maleimido-methyl radicals based on the total moles of maleimido-methylene substituted phenylene radicals and unsubstituted phenylene radicals. The identity of the polymer is confirmed by elemental analysis.

The product is found to be heat curable. The maleimidomethyl-substituted polysulfone is moldable to a solvent resistant part exhibiting a high degree of dimensional stability.

EXAMPLE 5

Boron trifluoride was bubbled into a mixture of 5 parts of a polycarbonate of Example 2, 3 parts of N-chloromethyltetrahydrophthalimide, and about 100 parts of a 7:3 mixture by weight of anhydrous tetrachloroethane and nitrobenzene. The reaction mixture was maintained at a temperature of about 110°C during the addition of the boron trifluoride which was introduced at a rate of about a bubble per second. During the reaction which lasted about 22 hours, the mixture was maintained substantially anhydrous. A product was precipitated from the mixture at the termination of the reaction by pouring the mixture into methanol. Based on the method of preparation and infrared spectrum, the product was a polycarbonate having about 15 mole percent of its 2,2-bis-(4-hydroxyphenyl)propane radicals substituted with tetrahydrophthalimidomethylene radicals, based on the total moles of such imido-substituted radicals and unsubstituted 2,2-bis(4-hydroxyphenyl)propane radicals in the polycarbonate. The identity of the product was further confirmed by its elemental analysis, Theoretical: wt %; C,73.7; H,5.3; N,0.75, Found: C,74.7; H,5.6; N,0.75. The product is found to be curable by heat or by free radical initiation and can be employed to make craze resistant coatings on metallic and other substrates.

EXAMPLE 6

Boron trifluoride was bubbled into a mixture maintained at 75°C of 5 parts of the polycarbonate of Example 2, 3 parts of N-chloromethylphthalimide, 134 parts of methylene chloride and about 10 parts of nitrobenzene. Methylene chloride was allowed to distill from the mixture, the mixture was agitated during the addition of the boron trifluoride over a period of about 6 hours during the boron trifluoride addition. There was then added to the mixture about 50 parts of chloroform. The product was then precipitated by pouring the mixture into methanol. Based on method of preparation, the product was a phthalimido-methylene substituted polycarbonate having about 50 mole percent of chemically combined phthalimido-methylene substituted 2,2-bis(4-hydroxyphenyl)propane radicals and based on the total moles of such phthalimido-methylene substituted radicals and unsubstituted 2,2-bis(4-hydroxyphenyl)propane radicals in the polycarbonate. The identity of the product was further confirmed by its infrared spectrum, showing strong carbonyl absorption at 1,715 $cm^{-1}$, and elemental analysis, C,74.6%; H,5.3%; N,1.5%. The phthalimidomethyl substituted polycarbonate shows improved solvent characteristics and craze resistance when compared to the same polycarbonate free of phthalimido-methylene substitution.

EXAMPLE 7

Boron trifluoride was slowly bubbled into a solution of 5 parts of a poly(2,6-dimethylphenyleneoxide) having a molecular weight of about 50,000 and 1 part of N-chloromethylmaleimide and a mixture of about 70 parts of anhydrous tetrachloroethane and 30 parts of anhydrous nitrobenzene at a temperature of about 70°C over a period of 7 hours. The mixture was then poured into methanol to effect the precipitation of product. Based on method of preparation, the product was a poly(2,6-dimethylphenyleneoxide) having about 11 mole percent of chemically combined phenylene oxide units substituted with maleimido-methylene radicals based on the total moles of phenylene oxide units in the polymer. The identity of the product was further confirmed by its infrared spectrum showing strong carbonyl absorption at 1,720 cm$^{-1}$. Elemental weight percent analysis also confirmed the identity of the product for approximately 11 mole percent maleimidomethylene substitution. Theoretical: C,77.4%; N,1.05%; Found: C,77.6%, N,1.2%. The polymer is useful as a protective coating in acid etching of metal surfaces, where a pattern can be imposed upon the surface by crosslinking part of the coating by ultraviolet light and exposing part of the metal surface by dissolving the shaded areas of the coating.

EXAMPLE 8

Boron trifluoride was slowly bubbled into a solution of 5 parts of polystyrene having a molecular weight of about 100,000 and 2.65 parts of N-chloromethyl-3,6-methano-2,2,3,6-tetrahydrophthalimide and 70 parts of tetrachloroethane and 30 parts of nitrobenzene while the temperature is maintained at 55°C over a period of about 12 hours. The imido-methylene alkylating agent was made from 3,6-methano-2,2,3,6-endomethylenetetrahydrophthalic anhydride employing thionylchloride. The mixture was then poured into methanol to effect the precipitation of the product. Based on method of preparation, the product was a polystyrene having chemically combined 3,6-methano-2,2,3,6-tetrahydrophthalimidomethylene radicals. The identity of the product was confirmed by its infrared spectrum.

EXAMPLE 9

A mixture of 44.7 parts of tetrahydrophthalimide, 24 parts of 37 percent formalin and about 1 part of a 5 percent sodium hydroxide solution was stirred for 3 hours at 25°C. The N-hydroxymethyltetrahydrophthalimide was isolated by recrystallizing the solid product from benzene, filtering, and allowing the product to dry. A mixture of 43.4 parts of N-hydroxymethyltetrahydrophthalimide and 150 parts of thionyl chloride was refluxed for 2 hours. N-chloromethyltetrahydrophthalimide was recovered from the mixture by stripping excess thionyl chloride under vacuum followed by recrystallizing the resulting product from petroleum ether.

Boron trifluoride was slowly bubbled into a mixture of 5 parts of a poly-(2,6-diphenyl-1,4-phenylone oxide) having an intrinsic viscosity of 0.82 in chloroform at 25°C, 4.02 parts of N-chloromethyltetrahydrophthalimide, 70 parts of anhydrous tetrachloroethane and 30 parts of anhydrous nitrobenzene. Prior to the addition of the boron trifluoride, the aforementioned mixture had been saturated with boron trifluoride. The mixture was stirred at 25°C for about 60 hours. The mixture was then poured into methanol to effect the precipitation of the product. Based on method of preparation, the product was a poly-(2,6-diphenyl-1,4-phenylene oxide) having about 78 mole percent of its aromatic carbocyclic radicals substituted with phthalimide-methylene radicals. The identity of the product was confirmed by elemental analysis having a nitrogen content of about 2.83 percent by weight which corresponds to a polyphenylene oxide with 78 percent of the repeating units substituted with phthalimidomethyl groups. The polymer is useful as a molding resin with excellent high temperature oxydative stability.

EXAMPLE 10

A mixture of 10 parts of the poly-(2,6-diphenyl-1,4-phenylene oxide) of Example 9, 8.03 parts of N-chloromethylphthalimide, 140 parts of anhydrous tetrachloroethane and 60 parts of nitrobenzene was stirred while 6.28 parts of anhydrous aluminum chloride was slowly added. The mixture was stirred for 16 hours at 55°C. The mixture was then put into methanol to effect the precipitation of the product. Based on the method of preparation, the product was a phthalimidomethylene substituted poly-(2,6-diphenyl-1,4-phenylene oxide). The identity of the product was confirmed by its infrared spectrum showing strong carbonyl absorption at 1,720 cm$^{-1}$.

EXAMPLE 11

Boron trifluoride was slowly introduced into a mixture of 5 parts of polystyrene and 4.9 parts of N-chloromethylphthalimide and 70 parts of anhydrous tetrachloroethane and 30 parts of anhydrous nitrobenzene over a period of 16 hours while the mixture was stirred and maintained at a temperature of 55°C. The mixture was then poured into methanol to effect a precipitation of product which was filtered and dried. Based on method of preparation, the product was a polystyrene having chemically combined phthalimidomethylene radicals. The identity of the product was confirmed by the characteristic carbonyl absorbance at 1,715 cm$^{-1}$ in its infrared spectrum. The polymer is useful as a molding composition with increased softening temperature as compared with unsubstituted polystyrene.

EXAMPLE 12

Boron trifluoride is slowly introduced into a 10 percent solution of styrene butadiene copolymer and N-chloromethylmaleimide in chlorobenzene. The styrene-butadiene copolymer is prepared in accordance with the method of Amos et al., U.S. Pat. No. 2,694,692 utilizing a mixture of 90 mole percent of butadiene and 10 mole percent of styrene. The N-chloromethylmaleimide is present in the mixture at about an equal molar amount of the styrene utilized in making the copolymer. The solution is stirred while the boron trifluoride is introduced over a period of about 15 hours at 25°C. The mixture is then poured into methanol and a product is precipitated. Based on method of preparation, the product is a styrene butadiene copolymer having chemically combined styryl radicals substituted with maleimidomethylene radicals.

A solution of the maleimido-methylene substituted polymer in chlorobenzene is poured onto an aluminum substrate and the solvent is allowed to evaporate at a temperature below its boiling point. The resulting film containing about 2 percent by weight of benzophenone is irradiated with ultraviolet light for a period of about 2 minutes. The film is found to be insoluble in chlorobenzene and exhibits valuable dielectric and insulating properties.

EXAMPLE 13

A tetrachloroethane solution was refluxed for about 5 hours and consisted of 5 parts of a poly(2,6-diphenylphenylene oxide) having a molecular weight of about 50,000, 2.7 parts of N-methylolmaleimide, 1.3 parts of anhydrous p-toluenesulfonic acid and 100 parts of solvent. During the reflux period, about one-half of the solvent along with water of reaction was distilled. The resulting mixture was then diluted with 100 parts of chloroform and poured into methanol. A quantitative yield of product was obtained which was identified as a maleimidomethyl substituted poly(2,6-diphenylphenyleneoxide) which was substantially the same product as obtained in Example 1.

EXAMPLE 14

Boron trifluoride is slowly introduced into an anhydrous tetrachloroethane solution which is mechanically stirred at a temperature of between 80°–120°C under a nitrogen atmosphere, consisting of 1 part of N-chloromethylmaleimide, 5 parts of a polyester prepared from a mixture of ethyleneglycol, isophthalylchloride and adipylchloride having about 10 mole percent of isophthalyl units, 40 mole percent of adipyl units and 50 mole percent of ethyleneglycol units based on the total moles of the various units in the polyester. After 12 hours, the mixture is poured into methanol contained in a Waring Blender. A polymeric product is recovered in quantitative yield. Based on method of preparation, the product is a polyester having about 10 mole percent of chemically combined units of the formula,

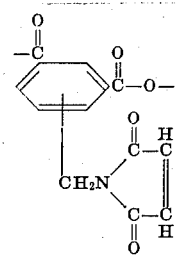

chemically combined with —CH$_2$CH$_2$O—, and

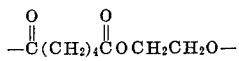

units. The identity of the product is further confirmed by its infrared spectrum.

A film is cast from a 10 percent solution in tetrachloroethane of a composition consisting of 98 parts of the above polymer and 2 parts of dicumylperoxide. The film is heated at a temperature of 150°C for 1 hour and 200°C for 1 hour. There is obtained a rigid solvent resistant film which can be employed as a wire coating enamel, or a dielectric.

EXAMPLE 15

N-(2-chloroethyl)tetrahydrophthalimide was made by the following procedure:

A mixture of 10 parts of N-(2-hydroxyethyl)tetrahydrophthalimide, which had been prepared from tetrahydrophthalic anhydride and ethanolamine by standard procedure, was refluxed with 25 parts of thionyl chloride for about 2 hours. Excess thionyl chloride was distilled and the residue purified by recrystallization from methanol. There was obtained a crystalline product having a melting point of about 85°C. Based on method of preparation and the aforementioned melting point, the product was N-(2-chloroethyl)tetrahydrophthalimide.

A mixture was made of 2.5 parts of a polystyrene having a molecular weight of about 100,000, 2 parts of N-(2-chloroethyl)tetrahydrophthalimide and 35 parts of anhydrous tetrachloroethane. The solution was stirred at a temperature of 90° over a period of 15 hours while a slow stream of boron trifluoride was passed into the mixture. The product was precipitated upon addition to methanol. Based on method of preparation and infrared carbonyl absorption at 1,710 cm$^{-1}$, the product was a tetrahydrophthalimidoethyl substituted polystyrene having an average of about 300 chemically combined polystyrene units, of which about 10 mole percent are substituted with tetrahydrophthalimidoethyl radicals,

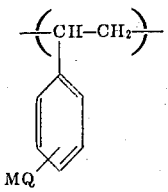

where MQ is a tetrahydrophthalimidoethyl radical, which are chemically combined with about 75 mole percent of styrene units of the formula,

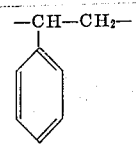

A film of the imido-substituted polystyrene is cast from a tetrachlorethane solution onto an aluminum substrate. The film is exposed to β-radiation to a dosage of 50 MR. It is found to be insoluble in several organic solvents including tetrachlorethane and useful as an organic solvent resistant coating.

Although the above examples are limited to only a few of the very many imido-substituted aromatic carbocyclic polymers included within the scope of the present invention, it should be understood that the present invention includes organic polymers shown by formulas (2) and (3) having at least one chemically combined imido radical of formula (1).

We claim:

1. A film forming aromatic carbocyclic organic polymer which can be employed as a moulding resin or solvent resistant coating compound which consists essentially of from five to 500 chemically combined units selected from the group consisting of phenylene and units of the formula,

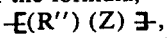

where R″ is a polyvalent aromatic carbocyclic organo radical, substituted with at least one imidomethylene radical of the formula,

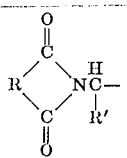

directly joined to a ring carbon atom of an aromatic carbocyclic radical to provide for aromatic carbocyclic organic polymer having from about 1 mole per cent up to 99 mole per cent of such imidomethylene substituted aromatic carbocyclic organo radicals based on the total number of aromatic carbocyclic organo radicals in the aromatic carbocyclic organic polymer, Z is a polyvalent connective selected from the group consisting of

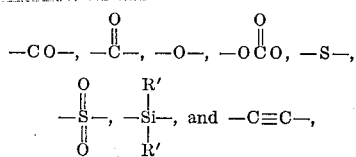

R is a divalent organo radical selected from the group consisting of hydrocarbon radicals and halogenated hydrocarbon radicals, and R" is a monovalent radical selected from the group consisting of hydrogen, monovalent hydrocarbon radicals and halogenated monovalent hydrocarbon radicals.

2. The imido-substituted polyarylene oxide in accordance with claim 1.

3. The imido-substituted polyarylene carbonate in accordance with claim 1.

4. The imido-substituted polyarylene ester in accordance with claim 1.

5. The imido-substituted polyarylene sulfone in accordance with claim 1.

6. Aromatic carbocyclic organic polymer in accordance with claim 1, where the imido-methylene radical is a maleimido-methylene radical.

7. Aromatic carbocyclic organic polymer in accordance with claim 1, where the imido-methylene radical is a phthalimido-methylene radical.

8. The product obtained by curing the composition at a temperature range of from 50° to 300°C. consisting essentially of the polymer of claim 1.

* * * * *